United States Patent
Askew et al.

(10) Patent No.: US 6,258,488 B1
(45) Date of Patent: Jul. 10, 2001

(54) BATTERY SEPARATORS

(75) Inventors: Gregory J. Askew, Coventry; Stephen J. Law, Nuneaton; Heather Street, Coventry, all of (GB)

(73) Assignee: Tencel Limited, Derby (GB)

( * ) Notice: Subject to any disclaimer, the term of this patent is extended or adjusted under 35 U.S.C. 154(b) by 0 days.

(21) Appl. No.: 09/164,455

(22) Filed: Oct. 1, 1998

Related U.S. Application Data

(63) Continuation of application No. PCT/GB97/00825, filed on Mar. 24, 1997.

(30) Foreign Application Priority Data

Apr. 2, 1996 (GB) .................................................. 9606914

(51) Int. Cl.⁷ .................................................. H01M 2/16
(52) U.S. Cl. .......................... 429/250; 429/248; 429/249
(58) Field of Search ................... 429/247, 248, 429/249, 250

(56) References Cited

U.S. PATENT DOCUMENTS

| | | | |
|---|---|---|---|
| 4,039,729 | * 8/1977 | Benczur-Urmossy et al. | 429/206 |
| 5,277,857 | 1/1994 | Nicholson et al. . | |
| 5,366,832 | * 11/1994 | Hayashi et al. | 429/249 |
| 5,700,599 | * 12/1997 | Danko et al. | 429/249 |
| 5,700,600 | * 12/1997 | Danko et al. | 429/249 |
| 5,942,354 | * 8/1999 | Oxley et al. | 429/247 |

FOREIGN PATENT DOCUMENTS

| | | |
|---|---|---|
| 0 572 921 | 12/1993 | (EP) . |
| 0 712 889 | 5/1996 | (EP) . |
| WO 96/13071 | * 5/1996 | (WO) .............................. H01M/2/16 |
| WO 96/37653 | 11/1996 | (WO) . |

* cited by examiner

*Primary Examiner*—Carol Chaney
(74) *Attorney, Agent, or Firm*—Nixon & Vanderhye P.C.

(57) ABSTRACT

A battery (31) having a battery separator (34, 35, 36) which is made from a cellulose film formed from a solution of cellulose in an amine oxide solvent. The separator performs well in alkaline battery cells to operationally separate the different polarity electrodes (32,33).

18 Claims, 1 Drawing Sheet

BATTERY SEPARATORS

This application incorporates by reference the subject matter of British Patent Application No. 9606914.1 filed Apr. 2, 1996 and International Application No. PCT/G97/00825 filed Mar. 24, 1997. This application is a continuation of PCT/GB97/00825 filed Mar. 24, 1997.

BACKGROUND OF THE INVENTION

This invention relates to a battery separator and to a battery incorporating a separator. The invention also relates to a method of making a battery separator.

Discussion of Prior Art

It is known to use regenerated cellulose film as a separator in primary and secondary or rechargeable batteries. Paper and cellulose film is able to act as a barrier between electrodes to prevent internal short circuiting whilst having sufficient permeability and electrolyte absorbence to allow the cell reaction to take place. The separator has to be sufficiently impregnated with electrolyte for the necessary cell reaction. The life of a rechargeable battery can be limited by the breakdown of the separator which has to operate in a hostile environment, typically a highly alkaline environment. In some circumstances there is a build-up of crystals, typically zinc oxide crystals, in the negative electrode which can pierce the separator barrier.

In EP-A-0572921 separators, particularly for alkaline batteries, are disclosed which are formed from fibrillated lyocell fibres which are mixed with polyvinyl alcohol fibre and a polyvinyl alcohol fibrous binder. However such separators are complicated to make and involve fibrillation of the lyocell fibres in a pulper and fiberizer.

The manufacture of shaped polymer articles by extrusion of a solution of cellulose in an aqueous tertiary amine N-oxide solvent into an aqueous coagulating bath is described, for example, in U.S. Pat. No. 4,246,221, the contents of which are incorporated herein by way of reference. Such a process may be referred to as a solvent-spinning process. Fibres and films produced by such a method may be referred to as solvent-spun cellulose fibres and films, and generically the fibres are known as lyocell fibres. The concentration of cellulose in solution in amine oxide is generally in the range from 5 to 30% by weight.

Film may be formed by the extrusion of a seamless tube of cellulose solution in an amine oxide solvent, for example as described in U.S. Pat. No. 5,277,857. The tube may be opened out to form a strip, or flattened to form a double layered strip. The film formed from cellulose solution is defined in this document as non-derivatised cellulose and that terminology will be used in the present description. Alternatively the film may be extruded through a slot die as is described in our co-pending international patent application PCT/GB96/03215.

SUMMARY OF THE INVENTION

According to the present invention there is provided a battery separator comprising at least one layer of non-derivatised cellulose film.

The cellulose is dissolved in a tertiary-amine-N-oxide solvent for cellulose, preferably N-methyl-morpholine-N-oxide. The concentration of cellulose in the solvent is preferably from 2 to 25 percent (w/w), and more preferably from 4 to 18 percent (w/w) and typically about 15%. The degree of polymerization of the cellulose is preferably from 200 to 5000, and more preferably from 400 to 1000, and typically around 800.

The cellulose solution may be extruded through a heated slot die which is heated to a temperature of between 80–120° C. The film passes through an air gap of up to 300 mm and generally between 20–100 mm, before entering a regeneration bath.

Such a separator is for use in both primary and secondary cells. The film separator may be reinforced by fibrous reinforcement, in particular lyocell fibres.

The invention further includes an alkaline battery cell having a cellulose film battery separator of the type described above.

A battery of this type has improved long term charge stand characteristics. Preferably the battery has a potassium hydroxide based electrolyte and on discharge after a prolonged charged stand has substantially no voltage dip on discharge.

Film separators in accordance with the present invention have particularly good physical properties after immersion in alkaline solutions when compared with regenerated cellulose films produced by the xanthate or viscose process. In particular it has been found that non-derivatised films have better chemical stability and better retention of tensile properties after immersion in potassium hydroxide solutions. Substantially similar strength films to those of films produced by the viscose process can therefore be achieved with thinner films in accordance with the present invention.

The invention also provides for a method of manufacture of battery separators in which the separator comprises a non-derivatised cellulose film formed from a flat web of cellulose in solution in an amine oxide solvent which is regenerated in a bath containing an aqueous solution of said amine oxide solvent such that the amine oxide concentration does not exceed 50% by weight.

If the amine oxide concentration exceeds 50% the stability of the film in potassium hydroxide deteriorates.

Also according to the present invention there is provided an alkaline battery cell, preferably a silver/zinc cell, having a voltage drop over the first minute of discharge after a prolonged charged stand of around 25% or less of the original voltage.

The battery cell has a separator formed from non-derivatised cellulose film.

The invention is particularly applicable to primary 'button' cells.

BRIEF DESCRIPTION OF THE DRAWINGS

The invention will now be described, by way of example only, and with particular reference to the accompanying drawings, in which:—

DETAILED DISCUSSION OF PREFERRED EMBODIMENTS

Figure 1:
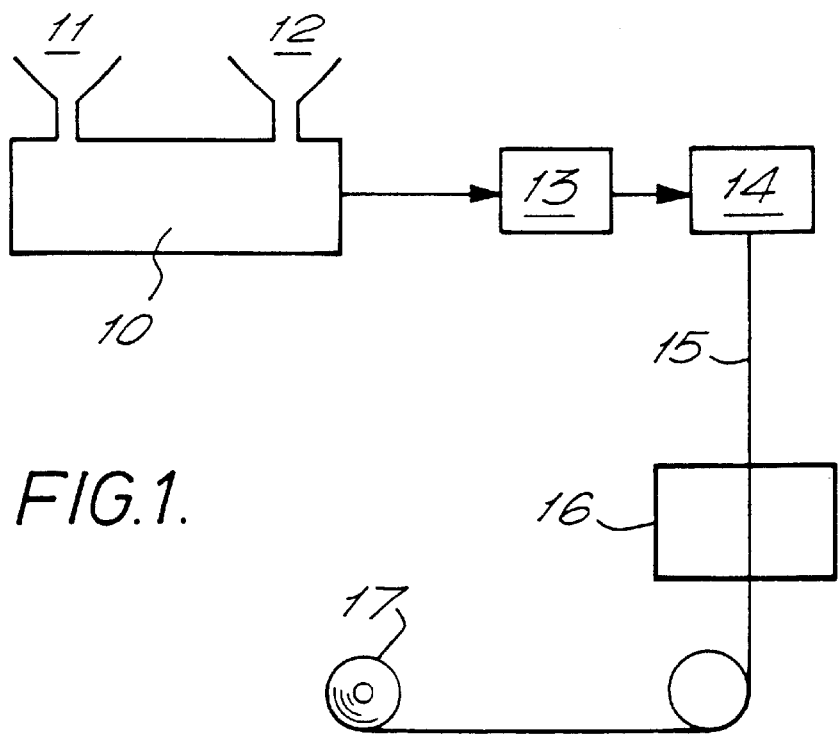
FIG. 1 is a schematic drawing of apparatus for making film for use as separators according to the present invention.

In FIG. 1 there is shown a mixer 10 with inlets 11 and 12 which receive shredded cellulose and amine oxide solvent, respectively. The hot solution is pumped via a metering pump 13 to a slotted extrusion die 14 to form a film 15.

The film 15 leaves the slotted die 14 and passes through a regeneration bath 16 which contains water or a weak aqueous solution of amine oxide. The film is then washed and wound on a collection roller 17.

The cellulose solution is prepared by dissolving raw cellulose material with N-methyl-morpholine-N-oxide. The solution contains 15% cellulose, 10% water and 75% amine oxide (percentages by weight). The cellulose preferably has a degree of polymerisation in the order of about 800.

The cellulose solution is processed through a slotted die heated to a temperature of about 110° C. having a width of 1 meter and a gap of 100 microns with a dope temperature of 105° C. and a pressure of 50 bar with a dope feed rate of 80 kg/hr and a wind up rate of 10 m/minute. The film produced was a nominal 25 microns thick when dry.

The die 14 is located above the regeneration bath 16 so that it is spaced from the surface of the precipitant solution by an air gap of about 20 mm. The precipitant solution preferably contains a dilute aqueous solution of amine oxide, preferably 25% amine oxide in water. The solution is heated to between 20–45° C. and is preferably held at room temperature, that is between 20–25° C.

The stability of the film 15 in KOH will be dependent upon the % concentration of amine oxide in the regeneration bath. It is apparent that the stability falls once the amine oxide concentration exceeds 50%. By maintaining the bath concentration between 5–50%, and preferably between 20–30% it is possible to obtain non-derivatised film having the required retention of physical properties after exposure to KOH solution.

Table 1 below illustrates the relationship between physical properties after exposure to KOH and amine oxide concentrations in the spin bath.

TABLE 1

Tensile Properties of non-derivatised cellulose film in KOH vs. amine oxide precipitant concentration

| % AO Conc. in precipitation bath | Tensile strength in 30% KOH (kg/mm$^2$) |
| --- | --- |
| 25 | 0.694 |
| 45 | 0.706 |
| 65 | 0.382 |

5 mm width samples were used with a variable gauge length of between 1.5 and 6.8 cm. X-head speed was 200 mm/min. Samples were soaked for 1 hour in KOH, and tested wet. Results quoted are averages of 5 tests.

Film, produced as described above, is drawn in the direction of manufacture, and samples of film 19 microns thick were cut into 0.5 cm wide strips in the direction of manufacture (MD) and transversely thereto. These samples were compared with similar samples of cellulose film produced by the viscose process. The samples of film were tested dry, and after immersion in water and 30% potassium hydroxide solution for various time periods.

The samples were tested for tensile properties and were tested wet using an Instron with cross head speed of 20 mm/minute.

The results are given in the Tables 2 to 4 below with the dry untreated film being given a 100 rating and the treated samples being rated as percentage of the retained dry properties.

MD is used for samples taken in the direction of manufacture, and transverse or TD is used for samples tranverse to the manufacturing direction.

TABLE 2

| | Ultimate Tensile Strength | | | |
| --- | --- | --- | --- | --- |
| | Viscose Film | | Non-Derivatised Film | |
| Sample | MD | Transverse | MD | Transverse |
| DRY | 100 | 100 | 100 | 100 |
| 1 hour water | 25 | 39 | 55 | 55 |
| 1.5 hours water | 35 | 29 | 57 | 52 |
| 1 hour KOH | 13 | 20 | 48 | 42 |
| 1.5 hour KOH | 15 | 20 | 52 | 36 |
| 24 hours KOH | 10 | 6 | 29 | 36 |
| 48 hours KOH | 11 | 10 | 36 | 33 |

It can be seen that non-derivatised film has better retention of its strength properties than viscose film when immersed in an alkaline environment. The increase in the extension to break properties in manufacturing direction are comparable, however in the transverse direction the non-derivatised film shows a much larger increase than the viscose film.

Samples of biaxially orientated viscose, and biaxially orientated and non-derivatised film made according to U.S. Pat. No. 5,277,857 were subject to similar tests, the results of which are given in Table 4.

TABLE 4

| Sample | Viscose Film Tensile Strength | Lyocell Film Tensile Strength |
| --- | --- | --- |
| DRY | 100 | 100 |
| 1 hour KOH | 13 MD | 31 MD |
| 1 hour KOH | 20 TD | 17 TD |

Biaxially oriented film may be produced using the apparatus described in our copending international patent application No PCT/GB96/03215. Alternatively, the biaxially oriented film may be made by the method disclosed in U.S. Pat. No. 5,277,857.

Figure 2:
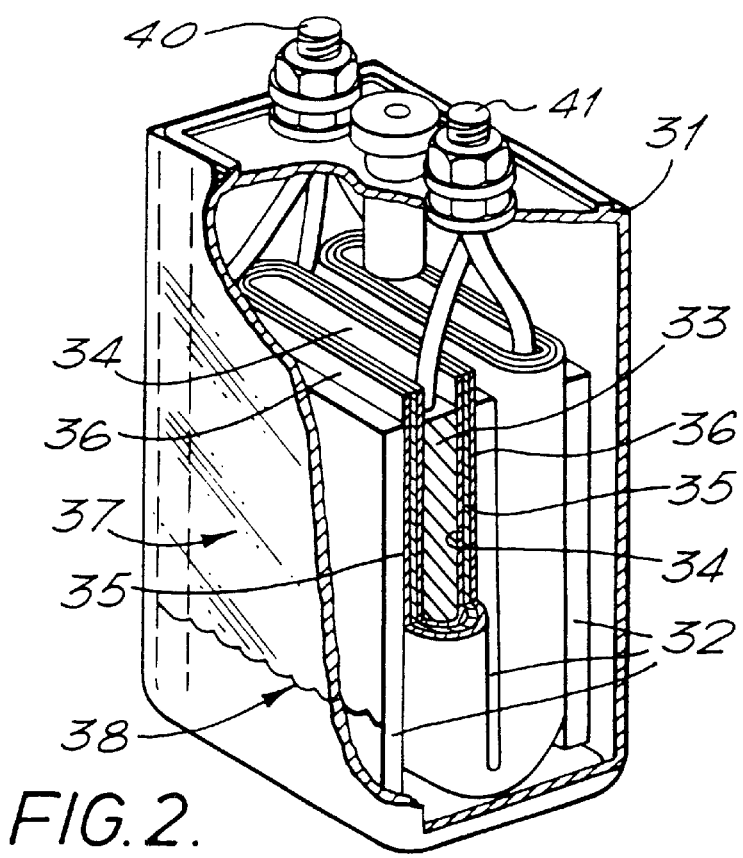
FIG. 2 is a partly cut away isometric view of a battery incorporating a separator according to the present invention.

Test batteries of the type shown in FIG. 2 were manufactured. The battery 31 is a zinc-silver oxide secondary battery. The battery 31 includes zinc negative electrodes 32 connected to negative terminal 40 arranged between silver/silver oxide positive electrodes 33 connected to positive terminal 41. The silver electrodes are cased with a multi-layer separator comprising an inner layer of film 34, one or more intermediate layers 35, and an outer layer 36.

The electrodes are held within a tightly fitting plastic case 37 which contains electrolyte 38 which is essentially absorbed into the active materials including the separator film layers.

A number of silver-zinc high rate cells were made incorporating four layer separators formed by wrapping non-derivatised film 15 four times around the electrodes so that the electrodes are held in a separator pocket. These cells were tested for comparison with identical batteries incorporating four layers of separators formed from two types of viscose films, commonly used in batteries, Flexel P.UT 002 and Cellophane P00350. The cells were charged with 45% KOH, or with "Russian electrolyte". Russian electrolyte is a mixture of 45% KOH, with about 15% by weight of sodium borate, lithium hydroxide, and zinc oxide, and was described at the October 1995 Battery Conference of the Electrochemisrty Society (US).

After filling the cells with 45% KOH they were automatically cycled in a string of four cells at the C rate for 0.75 hour during discharge, and 0.1 C rate during charge, i.e. for a 5 amp-hour cell the C rate during discharge would be 5 amps for 45 minutes and the 0.1 C rate during charge would be 0.5 amps up to a potential of 8.12 volts. After every 15 to 20 cycles the string of four cells were discharged manually at the C rate to 4.8 volts to determine its capacity. The results of the discharge tests are given in Table 5.

TABLE 5

| Sample | Viscose Film Tensile Strength | Lyocell Film Tensile Strength |
|---|---|---|
| DRY | 100 | 100 |
| 1 hour KOH | 13 MD | 31 MD |
| 1 hour KOH | 20 TD | 17 TD |

Thus it can be seen that after a large number of cycles of charge and recharge the performance of the non-derivatised film is comparable with that of the Flexel film.

In a further test relating to 32 day charged wet stand, the batteries were charged and allowed to stand for 32 days and then discharged at 5 amp. The failure point is the point at which the battery output falls below 1.3 volts. The batteries were then recharged for subsequent 32 day charged stands. The test data is shown in Table 6.

TABLE 6

Discharge Data for cells after 32 days Charged stands.
The discharge is given in Amp hours.

| | Cell Type | | | | | |
|---|---|---|---|---|---|---|
| | Flexel | | Cellophane | | Non-Derivatised Cellulose | |
| 32 Day | KOH | Russian | KOH | Russian | KOH | Russian |
| 1st Stand | 5.77 | 4.46 | 5.94 | 4.83 | 5.77 | 5.26 |
| 2nd Stand | 4.33 | 4.06 | 4.29 | 3.33 | 4.82 | 4.57 |
| 3rd Stand | 4.29 | 3.85 | 2.82 | 2.47 | 4.85 | 4.61 |
| 4th Stand | 3.21 | 3.44 | 1.56 | 1.25 | 4.04 | 3.75 |

Thus it can be seen that for prolonged storage of charged battery cells, in particular, the batteries with the non-derivatised cellulose film separator significantly out perform the other control batteries, showing very little change between the 2nd stand and the 3rd stand, and superior charge after the 4th stand The discharge voltage data for the third 32 day charge stand is shown in Table 7.

TABLE 7

| Discharge 32 wet stand 3 | Amp/ | Flexel | | Cellophane | | Non-Derivatised Cellulose | |
|---|---|---|---|---|---|---|---|
| Time | Hours | KOH | Russian | KOH | Russian | KOH | Russian |
| 0 | 0 | 1.852 | 1.85 | 1.851 | 1.852 | 1.852 | 1.851 |
| 1 min | 0.08 | 1.381 | 1.383 | 1.371 | 1.36 | 1.442 | 1.39 |
| 5 mins | 0.42 | 1.388 | 1.395 | 1.422 | 1.371 | 1.44 | 1.392 |
| 10 mins | 0.83 | 1.412 | 1.401 | 1.433 | 1.394 | 1.451 | 1.318 |

TABLE 7-continued

| Discharge 32 wet stand 3 | Amp/ | Flexel | | Cellophane | | Non-Derivatised Cellulose | |
|---|---|---|---|---|---|---|---|
| Time | Hours | KOH | Russian | KOH | Russian | KOH | Russian |
| 20 mins | 1.64 2.27 | 1.443 | 1.429 | 1.431 | 1.385 1.3 | 1.465 | 1.441 |
| 30 mins | 2.5 2.82 | 1.453 | 1.43 | 1.38 1.3 | | 1.467 | 1.444 |
| 40 mins | 3.33 3.85 | 1.435 | 1.391 1.3 | | | 1.454 | 1.425 |
| 50 mins | 4.16 4.29 | 1.363 1.3 | | | | 1.434 | 1.382 |
| 55 mins | 4.61 4.88 | | | | | | 1.3 |
| 58 mins | 4.85 | | | | | 1.3 | |

The discharge voltage date for the fourth 32 day charge stand is shown in Table 8.

TABLE 8

| Discharge 32 wet stand 4 | Amp/ | Flexel | | Cellophane | | Non-Derivatised Cellulose | |
|---|---|---|---|---|---|---|---|
| Time | Hours | KOH | Russian | KOH | Russian | KOH | Russian |
| 0 | 0 | 1.853 | 1.848 | 1.843 | 1.844 | 1.850 | 1.850 |
| 1 min | 0.08 | 1.341 | 1.374 | 1.346 | 1.351 | 1.435 | 1.381 |
| 5 mins | 0.42 | 1.363 | 1.358 | 1.378 | 1.340 | 1.434 | 1.381 |
| 10 mins | 0.83 | 1.398 | 1.388 | 1.389 | 1.346 | 1.444 | 1.407 |
| 15 mins | 1.25 | | | | 1.3 | | |
| 19 mins | 1.56 | | | 1.3 | | | |
| 20 mins | 1.64 | 1.437 | 1.420 | | | 1.465 | 1.435 |
| 30 mins | 2.82 | 1.416 | 1.407 | | | 1.456 | 1.429 |
| | 3.21 | 1.3 | | | | | |
| 40 mins | 3.33 3.44 | | 1.316 1.3 | | | 1.412 | 1.381 |
| 45 mins | 3.75 | | | | | | 1.3 |
| 48 mins | 4.04 | | | | | 1.3 | |

It can be seen from these details that after the third and fourth 32 day charged stands the batteries having like electrolytes and including the non-derivatised cellulose separators have a smaller voltage drop after 1 minute of discharge than the other batteries or each of the third and fourth 32 Day Stands. The discharge results after the third 32 Day Stand show that for battery using the non-derivatised cellulose separator the voltage drop within the first minute of discharge is less than 25% of the initial discharge voltage.

This is confirmed by the discharge results after the fourth 32 Day Stand which again show that the maximum voltage drop within the first minute for batteries having the same electrolyte is smaller for the non-derivatised cellulose separators than for the others. The voltage drop is again in the order of 25% of the initial discharge voltage or less. The voltage dip is also generally smaller for the batteries having the non-derivatised cellulose separators.

This smaller voltage drop is of importance with primary cells used in electronic equipment and hearing aids in particular silver-zinc primary cells. This may be due to the better chemical stability of the non-derivatised cellulose, as compared with the viscose, which may be oxidised to a smaller extent by the charged silver oxide electrodes. Hence the silver oxide electrodes would be reduced to a lesser extent which equates with less capacity loss.

A smaller reversion to $Ag_2O$ may also account for the reduced voltage dip.

Some of the batteries subjected to the 75 cycle test were examined (approximately 60 day wet life) and then re-examined after a further 72 days on charged stand i.e. 132 day wet life. The batteries in both cases were dissected and the separators analysed for silver content.

The results are given in Table 9 and Table 10, respectively.

TABLE 9

After 75 Cycles

| Battery Type Separator | Separate Silver Content | | | |
|---|---|---|---|---|
| | Layer 1 mg Ag/in$^2$ | Layer 2 mg Ag/in$^2$ | Layer 3 mg Ag/in$^2$ | Layer 4 mg Ag/in$^2$ |
| Flexel | 18.2 | 2.38 | 0.44 | 0.054 |
| Cellophane | 15.5 | 2.38 | 0.54 | 0.04 |
| Non-derivatised Cellulose | 12.9 | 1.51 | 0.33 | 0.054 |

Notes: Layer 1 is closest to silver electrode

TABLE 10

After 75 Cycles and 72 Day Charged Wet Stand

| Battery Type Separator | Separate Silver Content | | | |
|---|---|---|---|---|
| | Layer 1 mg Ag/in$^2$ | Layer 2 mg Ag/in$^2$ | Layer 3 mg Ag/in$^2$ | Layer 4 mg Ag/in$^2$ |
| Flexel | 20 | 7.17 | 1.53 | 0.097 |
| Cellophane | 24.7 | 8.51 | 2.56 | 0.45 |
| Non-derivatised Cellulose | 22.6 | 6.52 | 0.738 | 0.075 |

Notes:
1. Layer 1 is closest to silver electrode
2. Total wet life of cells was 132 days The results show that after 75 cycles the silver 15 content of the first three layers, closest to the silver electrode, is lowest for non-derivatised cellulose film separator. After 75 cycles and 72 days charged stand (approximately 132 days) the silver content is slightly higher in the first layer for the non-derivatised cellulose separator than for the Flexel Separator, but is lower in layers 2 and 3 which is more crucial. The non-derivatised cellulose separators perform better than the established materials.

What is claimed is:

1. A battery separator comprising at least one layer of oriented cellulose film made from a solution of cellulose in an amine oxide solvent.

2. A battery separator as claimed in claim 1, further including lyocell fibre reinforcement.

3. A battery including a cellulose film battery separator as claimed in claim 1, operatively separating the different polarity electrodes.

4. A battery as claimed in claim 3, comprising an alkaline cell battery.

5. A battery as claimed in claim 4, including a potassium hydroxide based electrolyte.

6. A battery as claimed in claim 4, having zinc and silver/silver oxide electrodes.

7. A battery as claimed in claim 3, wherein the battery separator comprises a plurality of layers of film.

8. A battery as claimed in claim 3 which, when discharged after a 32-day charged stand, exhibits a voltage drop over the first minute of discharge at 5 amps of around 25% or less of the original voltage.

9. A method of manufacturing a battery separator in which the separator comprises cellulose film and is formed by the steps of:

extrusion of a solution of cellulose in an amine oxide solvent through a slotted extrusion die to form an extruded web, regeneration of said extruded web to form said cellulose film in a regeneration bath containing an aqueous solution of said amine oxide solvent such that the amine oxide concentration does not exceed 50% by weight, and orienting said film by drawing.

10. A method as claimed in claim 9, wherein the concentration of amine oxide in the regeneration bath is from between 5% and 50% by weight.

11. A method as claimed in claim 9 wherein the temperature of the regeneration bath is between from 20 to 25° C.

12. A method as claimed in claim 9, in which the cellulose solution is extruded through a die located between 20 and 300 mm above a surface of the regeneration bath so that there is an air gap between the solution in the bath and the die.

13. A battery as claimed in claim 7, wherein the battery separator comprises four layers of film.

14. A method as claimed in claim 10, wherein the concentration of amine oxide in the regeneration bath is from between 20 to 50% by weight.

15. A battery separator as claimed in claim 1, wherein said film is a biaxially oriented cellulose film.

16. A battery separator as claimed in claim 1, wherein said film includes lyocell fiber reinforcement.

17. A battery separator as claimed in claim 16, wherein said fiber reinforcement is distributed through the oriented cellulose film.

18. A battery separator as claimed in claim 1, comprising a layer of non-woven fibrous material laminated to said oriented cellulose film.

* * * * *